(12) United States Patent
Goss

(10) Patent No.: US 9,546,753 B2
(45) Date of Patent: Jan. 17, 2017

(54) DRIVE APPARATUS FOR INSTALLING FLEXIBLE PIPE THROUGH IN-SITU PIPE

(71) Applicant: Chris Goss, Turner Valley (CA)

(72) Inventor: Chris Goss, Turner Valley (CA)

( * ) Notice: Subject to any disclaimer, the term of this patent is extended or adjusted under 35 U.S.C. 154(b) by 648 days.

(21) Appl. No.: 13/966,482

(22) Filed: Aug. 14, 2013

(65) Prior Publication Data

US 2013/0330130 A1 Dec. 12, 2013

Related U.S. Application Data

(62) Division of application No. 12/184,971, filed on Aug. 1, 2008, now abandoned.

(60) Provisional application No. 60/989,912, filed on Nov. 23, 2007.

(51) Int. Cl.
  *F16L 55/18* (2006.01)
  *B29C 63/34* (2006.01)
  *F16L 55/165* (2006.01)

(52) U.S. Cl.
  CPC .............. *F16L 55/18* (2013.01); *B29C 63/34* (2013.01); *F16L 55/165* (2013.01); *Y10T 156/1788* (2015.01)

(58) Field of Classification Search
  CPC .......... B29C 63/34; F16L 55/165; F16L 55/18
  See application file for complete search history.

(56) References Cited

U.S. PATENT DOCUMENTS

| | | |
|---|---|---|
| 3,095,130 A | 6/1963 | Schultz |
| 3,371,770 A | 3/1968 | Graham et al. |
| 3,422,631 A | 1/1969 | Silverman |
| 3,459,354 A | 8/1969 | Land et al. |
| 3,506,174 A | 4/1970 | Shuey, Jr. |
| 3,546,890 A | 12/1970 | Ede |
| 3,551,983 A | 1/1971 | Newbury |
| 3,632,031 A | 1/1972 | Gurner et al. |
| 3,713,301 A | 1/1973 | Bryant |
| 3,924,316 A | 12/1975 | Matlock et al. |
| 3,986,652 A | 10/1976 | Perkins |
| 3,998,065 A | 12/1976 | Darnell |
| 4,003,122 A | 1/1977 | Overmyer et al. |
| 4,185,809 A | 1/1980 | Jonnes |

(Continued)

FOREIGN PATENT DOCUMENTS

CA 2452413 3/2005

OTHER PUBLICATIONS

Fiberspar LinePipe—General Installation Guide (Jul. 2011)—excerpts.

*Primary Examiner* — James Sanders
(74) *Attorney, Agent, or Firm* — Conley Rose, P.C.

(57) ABSTRACT

Pusher apparatus and a method of using the apparatus inserts a flexible liner into an in-situ pipe. At least a pair of contra-rotating resilient drive assemblies, having a nip therebetween, drive the liner into the pipe. A guide tube can extend between the drive assemblies and the pipe. A pull head can be affixed to a leading end of the liner and adapted for sealing within a bore of the pipe and pressured fluid can be applied to pull a leading end of the liner into the pipe while the pusher pushes. The contra-rotating resilient drive assemblies can be one or more pair of opposing wheels or opposing tracks. Track assemblies can be mounted to a frame which is movable on rails and restrained with a load cell for measuring reactive forces while pushing. The rails can be angled for aligning the nip with the pipe.

13 Claims, 18 Drawing Sheets

(56) References Cited

U.S. PATENT DOCUMENTS

| | | | |
|---|---|---|---|
| 4,297,055 | A | 10/1981 | Peacock |
| 4,300,276 | A | 11/1981 | Davis |
| 4,475,604 | A | 10/1984 | Albertson et al. |
| 4,504,171 | A | 3/1985 | Florence, Jr. |
| 4,827,553 | A | 5/1989 | Turpin, Sr. et al. |
| 5,054,679 | A | 10/1991 | Shotts et al. |
| 5,091,137 | A | 2/1992 | Ledoux |
| 5,645,784 | A | 7/1997 | McMillan et al. |
| 5,816,293 | A * | 10/1998 | Kiest, Jr. ............. B29C 63/0095 138/97 |
| 5,839,613 | A | 11/1998 | Marcout et al. |
| 6,196,766 | B1 | 3/2001 | Graham |
| 2003/0233069 | A1 | 12/2003 | Gillespie, Jr. et al. |
| 2005/0051344 | A1 | 3/2005 | Goss |

* cited by examiner

DRIVE APPARATUS FOR INSTALLING FLEXIBLE PIPE THROUGH IN-SITU PIPE

CROSS-REFERENCE TO RELATED APPLICATION

This application claims the benefits under 35 U.S.C. 120 of the U.S. patent application Ser. No. 12/184,971, filed Aug. 1, 2008, and published as US 2009/0134554 on May 28, 2009, and claims the benefits under 35 U.S.C. 119(e) of the U.S. Provisional Application Ser. No. 60/989,912, filed Nov. 23, 2007, which are both incorporated fully herein by reference.

FIELD OF THE INVENTION

The present invention relates to apparatus and methods for remediation of in-situ existing pipelines and more particularly to inserting a flexible pipe such as plastic and fiberglass-reinforced composite liner into an existing conduit or pipeline and more particularly to driving assemblies for pushing pipe into the in-situ pipe using opposing wheels, opposing tracks, and optional pull assemblies for hydraulically assisting of said drive assemblies.

BACKGROUND OF THE INVENTION

Pipelines which carry fluids are susceptible to deterioration, corrosion and other conditions which seriously affect the lifespan of the pipe. Excavation of a pipeline or pipe, to replace sections that have deteriorated, is costly and often detrimental to the environment.

In-situ pipelines of pipe typically build corrosion and scale on an inner surface, over time. The buildup within the pipe bore acts as a barrier to insertion of the liner. Large pipes can be cleared using pigging techniques, however smaller diameter pipes do not lend themselves to this type of cleaning technique. U.S. Pat. No. 4,827,553 to Turpin Sr. et al teaches passing a pipeline scraper into the bore of a pipeline and reciprocating the scraper back and forth on lengths of cable to remove residue from the bore of the pipeline.

It is known to excavate down to a portion of the pipeline from surface, sufficient to gain access to the bore of the pipe, and insert a plastic liner into the bore of the existing, in-situ pipe to prevent leakage as a result of deterioration. Typically, liner is pulled through an existing pipe at the end of a threaded cable or the like, previously installed with conventional steel rods.

Due to the unwieldy lengths of liner that are required, the supply of liner is provided at surface and must be fed into the excavation down into the bore of the pipe. Due to the angle of the minimal excavation and the usual horizontal plane of the in-situ pipe, the orientation and insertion of inflexible liners presents a challenge.

As taught in U.S. Pat. No. 4,504,171 to Florence Jr., conventional malleable liners for underground pipes are often thick and relatively stiff. In order to insert the liner into the pipe, from a point above the pipeline, the liner must first be plastically deformed, using an installation tool comprising deforming rollers, to provide a distal curve in the liner. The liner is also deformed to form a proximal curve to direct the liner downward into the excavation, while the distal curve directs the liner generally toward the pipeline. The deforming rollers are also used as drive rollers to advance the liner into the pipe.

It is known to use a roller assembly coupled directly to an old pipe and aligned in co-linear arrangement thereto so as to insert flexible plastic pipe straight into a pipe, such as that disclosed in U.S. Pat. No. 4,300,276 to Davis. Lower rollers having an annular groove and a gripping surface, such as rubber, act to guide and support a flexible pipe. The lower rollers are connected in driving relation to each other by a drive chain. Upper rubber rollers, having an annular groove, engage the upper surface of the pipe opposite the lower rollers. The rollers are arranged in-line with the pipe to avoid bending of the flexible liner. The apparatus must be placed into close proximity with the pipe to be lined, including in an excavation around the pipe itself. Also, U.S. Pat. No. 3,546,890 to Ede teaches use of an apparatus lowered into an excavation adjacent an opening and comprising three rows of motor-driven rollers having pneumatic tires as thrusting means to advance a steel pipe into the opening formed by a mole plough.

More recent development of spoolable, elongated flexible liners, such as continuous composite line pipe, (FIBERSPAR® LinePipe™ from Fiberspar Corporation, West Wareham, Mass., USA) has provided an alternative to the more inflexible varieties of liner. Particularly when a large axial force is required to advance the liner, difficulties in handling are increased due to the flexibility of this type of liner—it is difficult to push a rope. Further, the composite nature of the liner does not permit overly rough handling.

Applicant previously introduced a pusher system, as shown in published Canadian Application 2,452,413 published Mar. 5, 2005, that implements a two or more pairs of contra-rotating and pneumatic drive wheels for driving pipe therebetween. While suited for many applications and installation of composite pipe, the maximum driving force is limited and the wheeled drive interface can impose high loads on the liner.

Further, where the material properties of the pipe are less robust, there is a need for a system for inserting pipe which does not introduce excessive loads into the pipe.

SUMMARY OF THE INVENTION

In a preferred embodiment of the invention, a convenient and efficient apparatus is provided for driving a flexible composite liner from above an excavation into an existing pipe exposed in the excavation. Accordingly, apparatus and methods of installing flexible liner into pipe are provided.

In one embodiment, a process is provided for inserting a flexible liner into a pipe comprising guiding the liner though a guide tube to the pipe, frictionally driving the liner through a nip between at least a pair of contra-rotating resilient drive assemblies; and pulling a leading end of the liner along the pipe by securing a pull head to a leading end of the liner and pressurizing the guide tube with fluid between the drive assemblies and the pipe for hydraulically pushing the pull head along the pipe while the drive assemblies push the flexible liner along the pipe.

Apparatus for inserting a flexible liner into a pipe comprises at least a pair of contra-rotating resilient drive assemblies. A nip is formed therebetween through which the flexible liner is frictionally driven. A drive motor connected to drive at least a first drive assembly of the pair of drive assemblies. A guide tube extends between drive assemblies and the pipe for guiding the driven flexible liner to the pipe. A pull head, affixed to a leading end of the flexible liner, is adapted for sealing within a bore of the pipe. A discharge seal about the flexible liner and adjacent the discharge end of the drive assemblies retains the fluid between the drive assemblies and the pipe. A source of pressurized air pressurizes the guide tube and pipe between the pull head and the discharge seal for hydraulically pushing the pull head along the pipe while the drive assemblies push the flexible liner along the pipe. In one embodiment the drive assemblies are one or more pairs of opposing wheels.

Whether or not a pull head is utilized, pushing apparatus for inserting a flexible liner into a pipe can comprise: a pair of contra-rotating resilient track assemblies having a feed end for receiving the flexible liner, a nip formed therebetween through which the flexible liner is frictionally driven, and a discharge end from whence the driven flexible liner exits the nip; a drive motor connected to drive at least a first track assembly of the pair of track assemblies; a pilot tube at the discharge end for receiving the driven flexible tube; and a guide tube extending from between the discharge end of the track assemblies and the pipe for guiding the driven flexible liner to the pipe. Optionally, a pull head, discharge seal and source of pressurized air, as described above, can be implemented to provide an additional pulling action.

Applicant frictionally engages and drives the flexible liner with a drive positioned spaced from the existing pipe and guiding the liner though a guide tube to align a leading end of the liner into the existing pipe. In one embodiment the flexible pipe is both driven and assisted by a pulling apparatus. A pull head, sealable to the existing in-situ pipe, is attached to the leading end of the flexible pipe. The pull head is hydraulically pushed along the in-situ pipe, pulling the liner along while the liner is also driven by the frictional drive, significantly reducing the compressive driving loads on the flexible liner. One such embodiment can include a wheeled pusher, as set for in Applicant's pending CA Patent application 2,452,413 published Mar. 5, 2005 coupled with an air-assisted pulling head, embodiments of which are disclosed herein.

In one embodiment, the guide tube is curved for aligning liner which is pushed or supplied at an angle to the existing in-situ pipe, and in some instances can extend along a path between the pipe, exposed in an excavation, to an elevation above the excavation. In some cases a surface connection may be made to existing in-situ pipe and the guide tube may merely permit convenient positioning of the equipment or to avoid surface obstructions such as a wellhead.

In other embodiments, increased driving capability is provided using improved drive members such as opposing and contra-rotating resilient tracks. A pair of opposing tracks can be supported in a pusher frame for riving flexible pipe. The pusher frame can be angled for better directing flexible pipe towards the in-situ pipe. The pusher frame can be movably supported on rails for reactive movement away from the flexible pipe being pushed. By restraining the frame against the reactive movement with a load cell, measure of pushing load can be determined.

In other embodiments, the tracked drive can be similarly fit with a pull head for assisting in the installation of flexible pipe into the in-situ pipe.

DETAILED DESCRIPTION OF THE PREFERRED EMBODIMENT

As shown in FIGS. 1 through 13, a flexible tubular such as a flexible liner can be driven using tracked drive embodiments for achieving increased driving force and reduced normal loading than has been heretofore achieved using prior wheeled embodiments. In other embodiments, both wheeled and tracked embodiments alike can be aided by sharing the driving forces between pushing and pulling embodiments. As discussed later, increased overall driving capability can be achieved by adding a complementary pipe-pulling embodiment which can be implemented with either Applicant's prior wheeled driving interface or Applicant's tracked driving embodiments.

Tracked Embodiment

Figure 1:
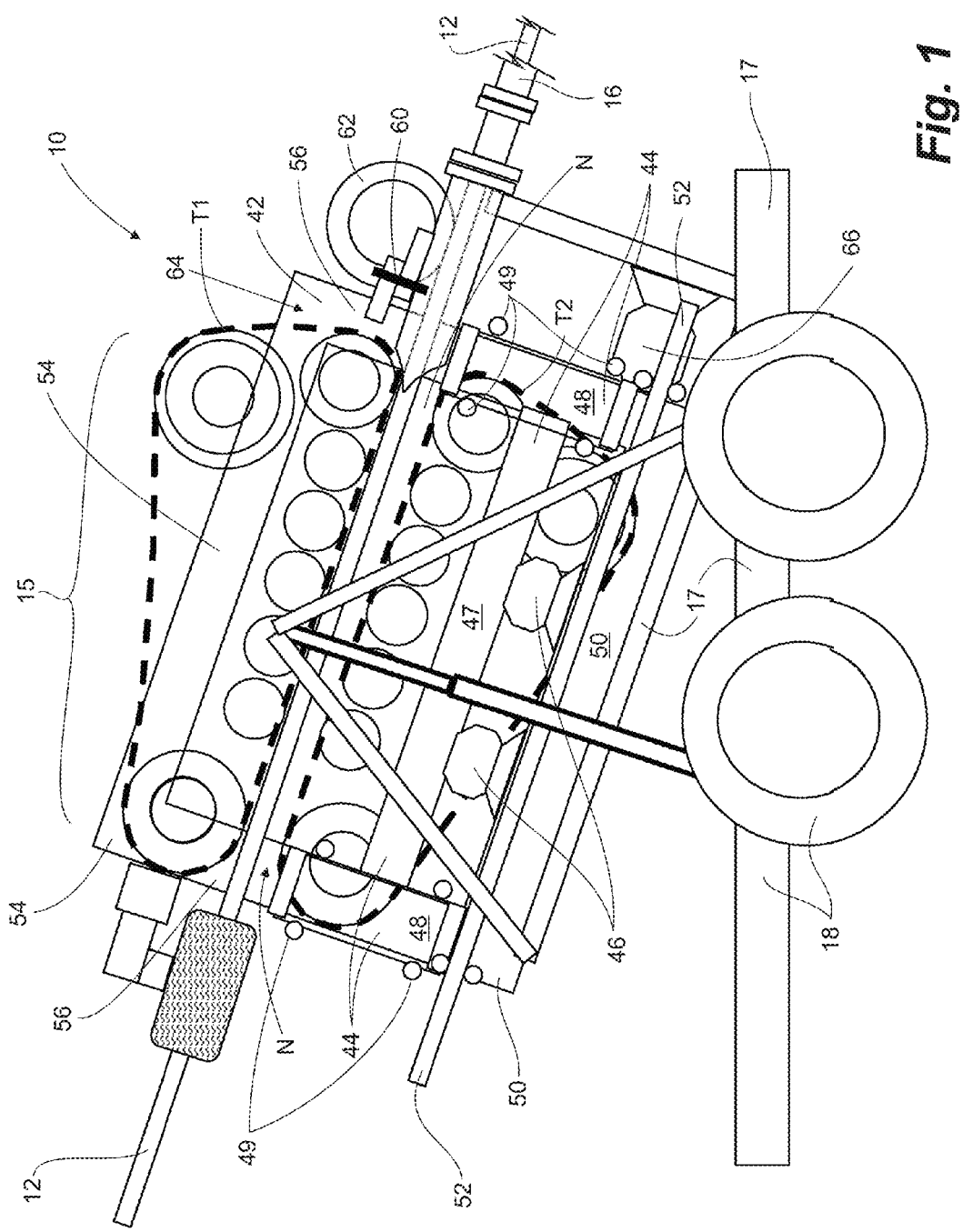
FIG. 1 is a schematic side view of a tracked pusher apparatus for installing liner according to one embodiment of the invention carried on a trailer unit, a pair of opposing tracks supported in a pusher frame and being angled for pushing liner into a pit, omitting some structure of the trailer unit for clarity, the tracks being spaced or retracted from the liner to open the nip.
Figure 2:
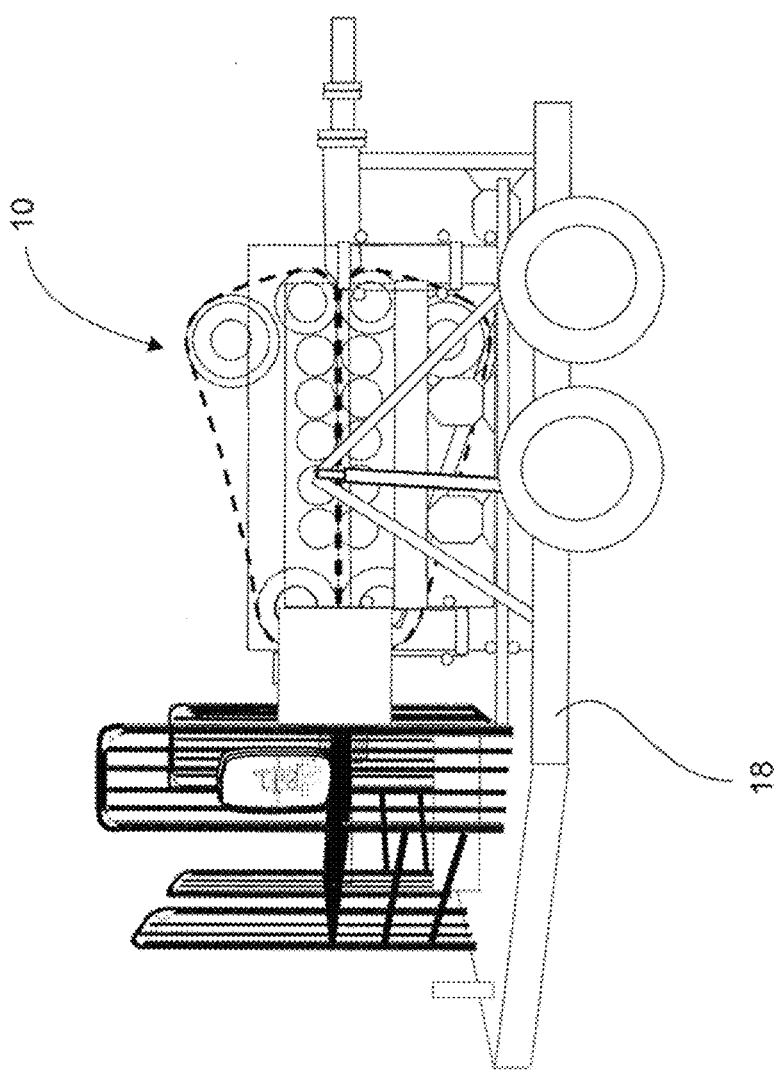
FIG. 2 is a perspective side view of the pusher apparatus supported on a trailer unit such as for transport.
Figure 3:
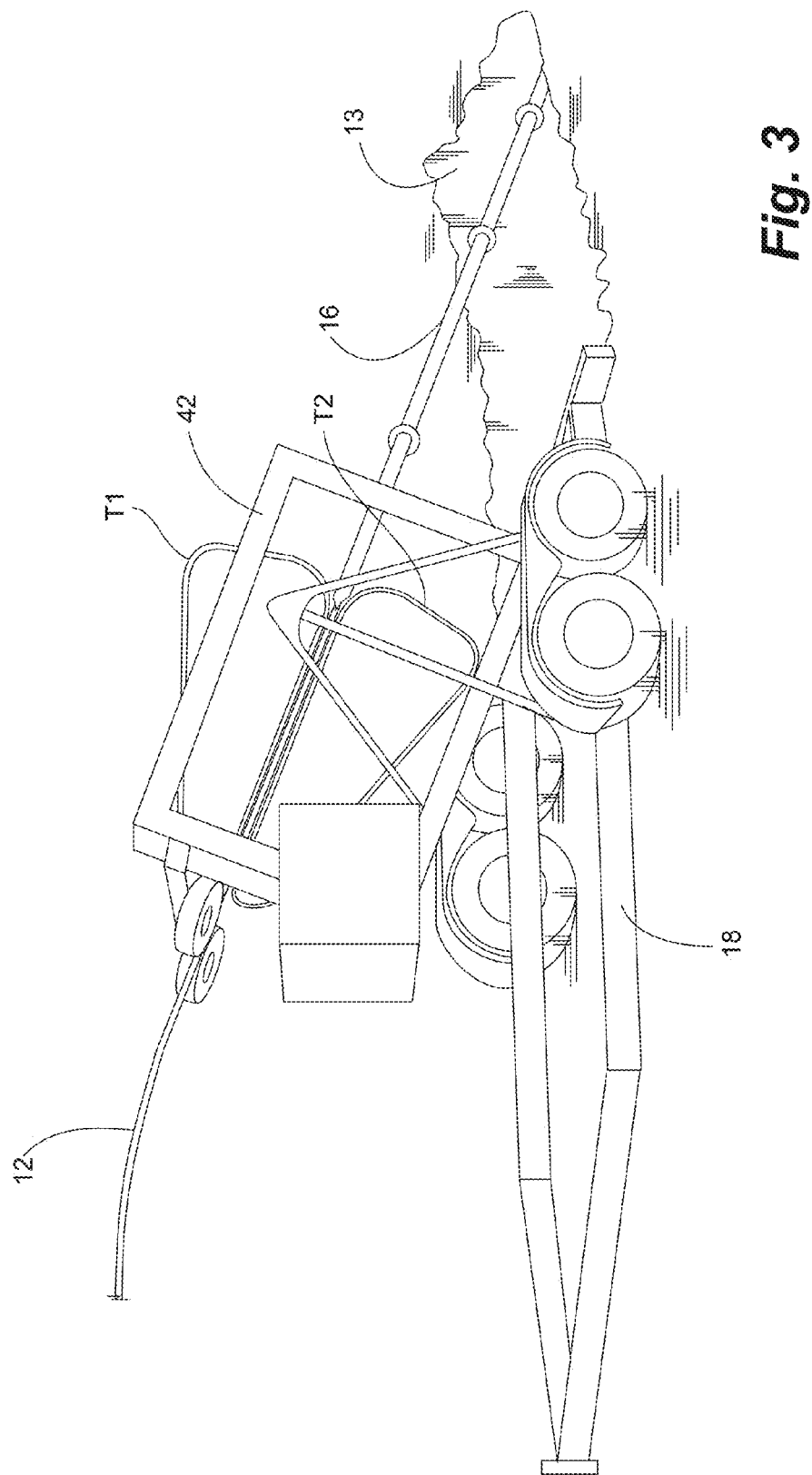
FIG. 3 is a back perspective view of the pusher apparatus of FIG. 2, illustrating pivoting for connection to an angled guide tube accessing a pipe in a pit.
Figure 4:
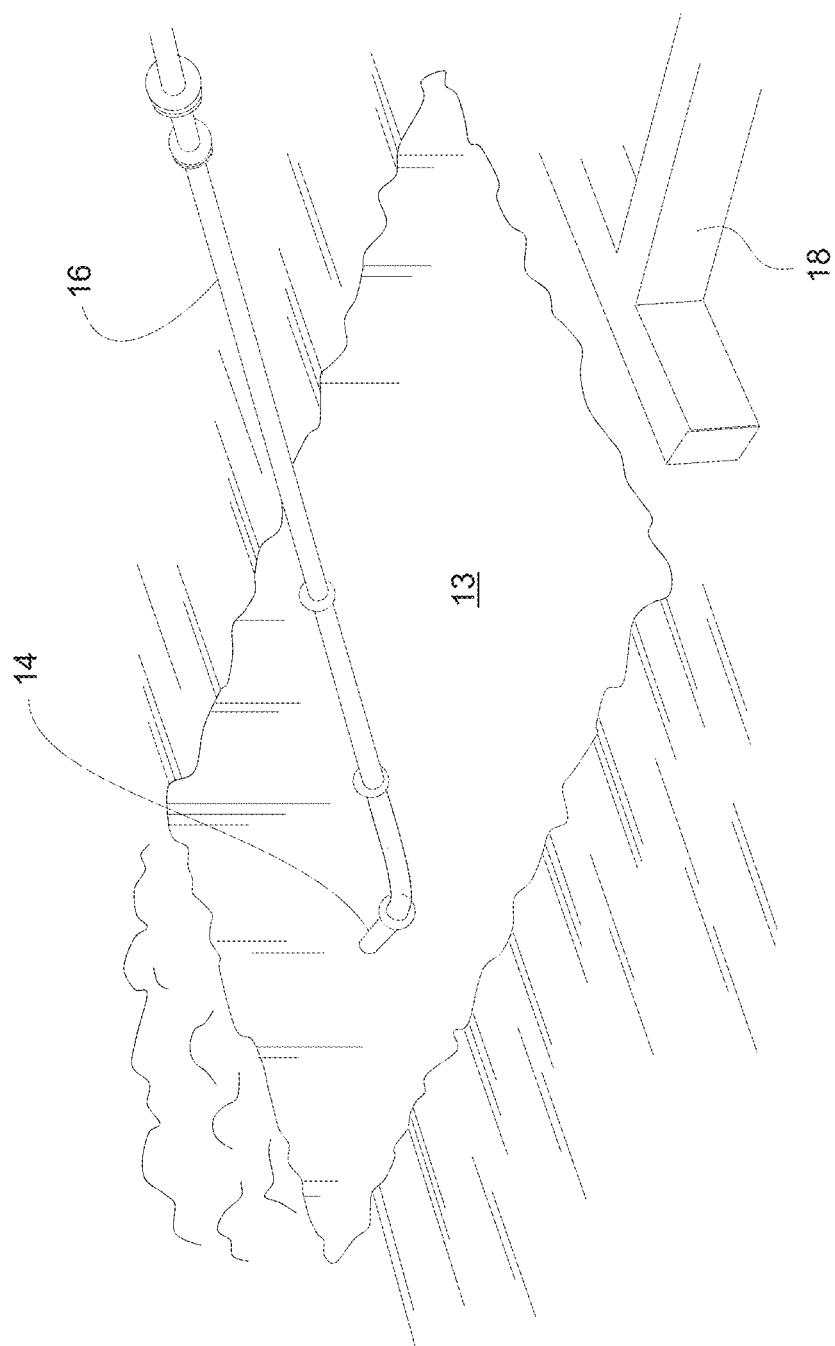
FIG. 4 is a side perspective view of the guide tube connection to the pipe in the pit according to FIG. 3.

In a first embodiment, and having reference to FIGS. 1, 2 and 3, a pusher apparatus 10 is provided to frictionally drive a flexible liner 12 into and through an exposed end of an in-situ pipe 14 (FIG. 4) to be rehabilitated. Where the pipe 14 is located at a elevation lower than the apparatus 10, such as adjacent a bottom of the excavation or pit 13, the apparatus 10 comprises a drive 15 and a guide tube 16 extending between the drive 15 and the pipe 14. The drive 15 need not be aligned with the pipe 14.

The drive 15 provides sufficient thrust to advance, push, or otherwise drive the flexible liner 12 through the guide tube 16 and through the pipe 14. When used, the guide tube 16 is sufficiently rigid to elastically direct the liner 12 through the guide tube 16 between the drive 15 and the pipe 14. A radius of curve for any part of the guide tube 16 is such that the liner 12 is guided elastically through the guide tube 16 without permanent deformation. Generally, a flexible continuous composite line pipe is typically two inch diameter from FIBERSPAR® LinePipe™ from Fiberspar Corporation, suitable to line four inch diameter pipe 14.

As shown in FIGS. 2 and 3, the drive 15 can be conveniently supported on a mobile structure or base 17 such as a trailer 18 for transport and positioning on site.

Figure 5:
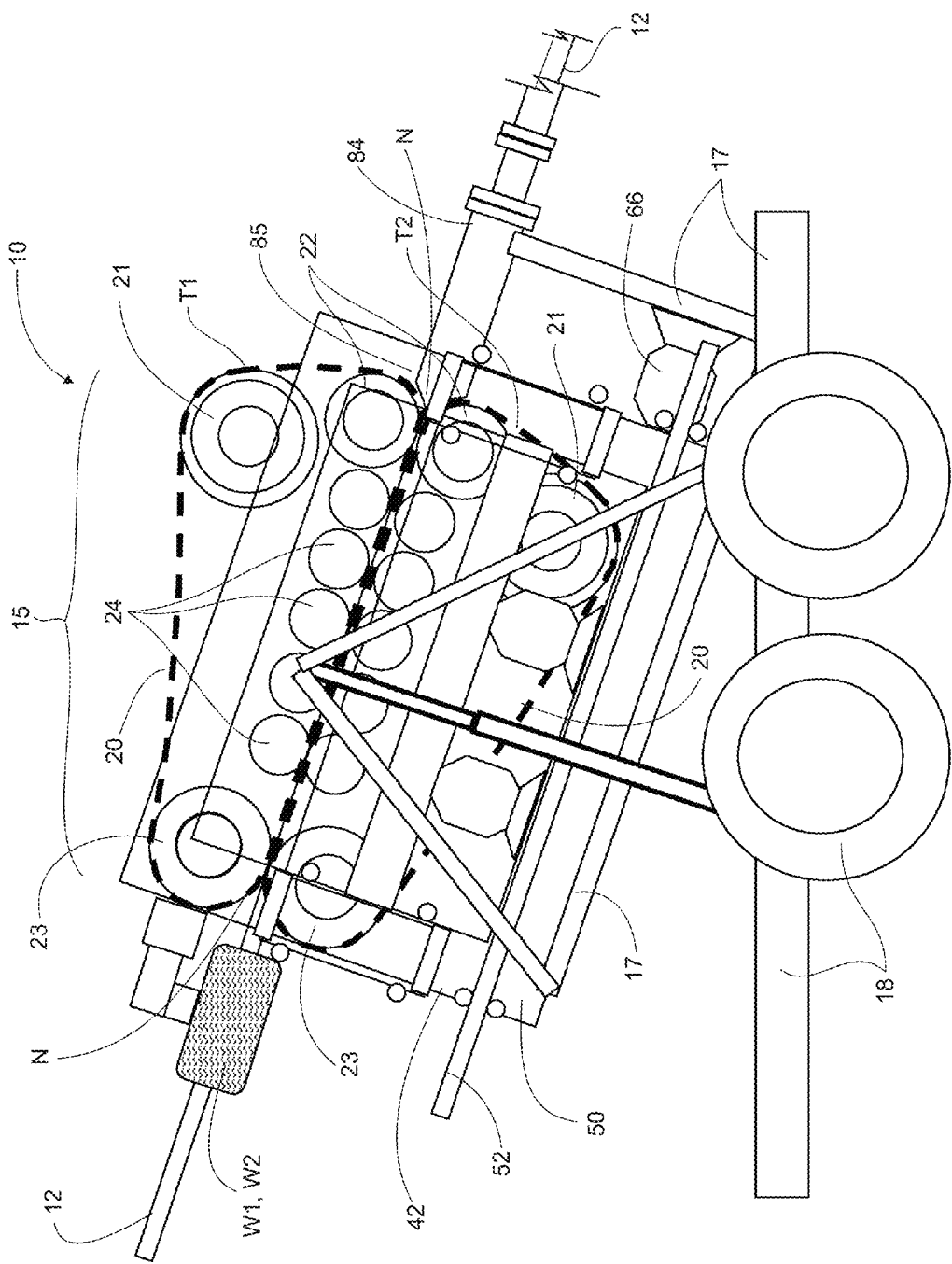
FIG. 5 is a schematic side view of the apparatus of FIG. 1, omitting some structure of the trailer unit for clarity, the nip of the tracks being closed for gripping the liner.
Figure 6:
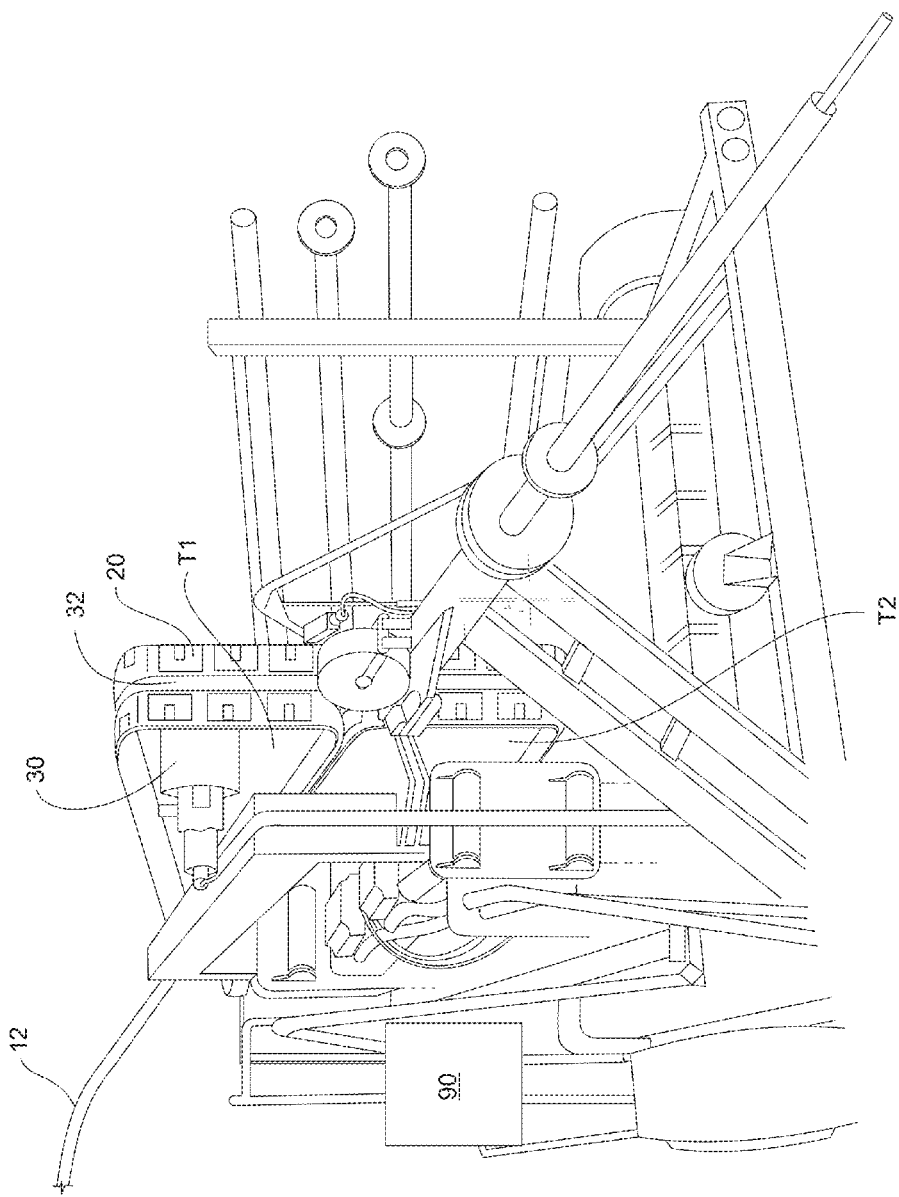
FIG. 6 is a front perspective view of the pusher apparatus oriented for installing liner into a pit.
Figure 7:
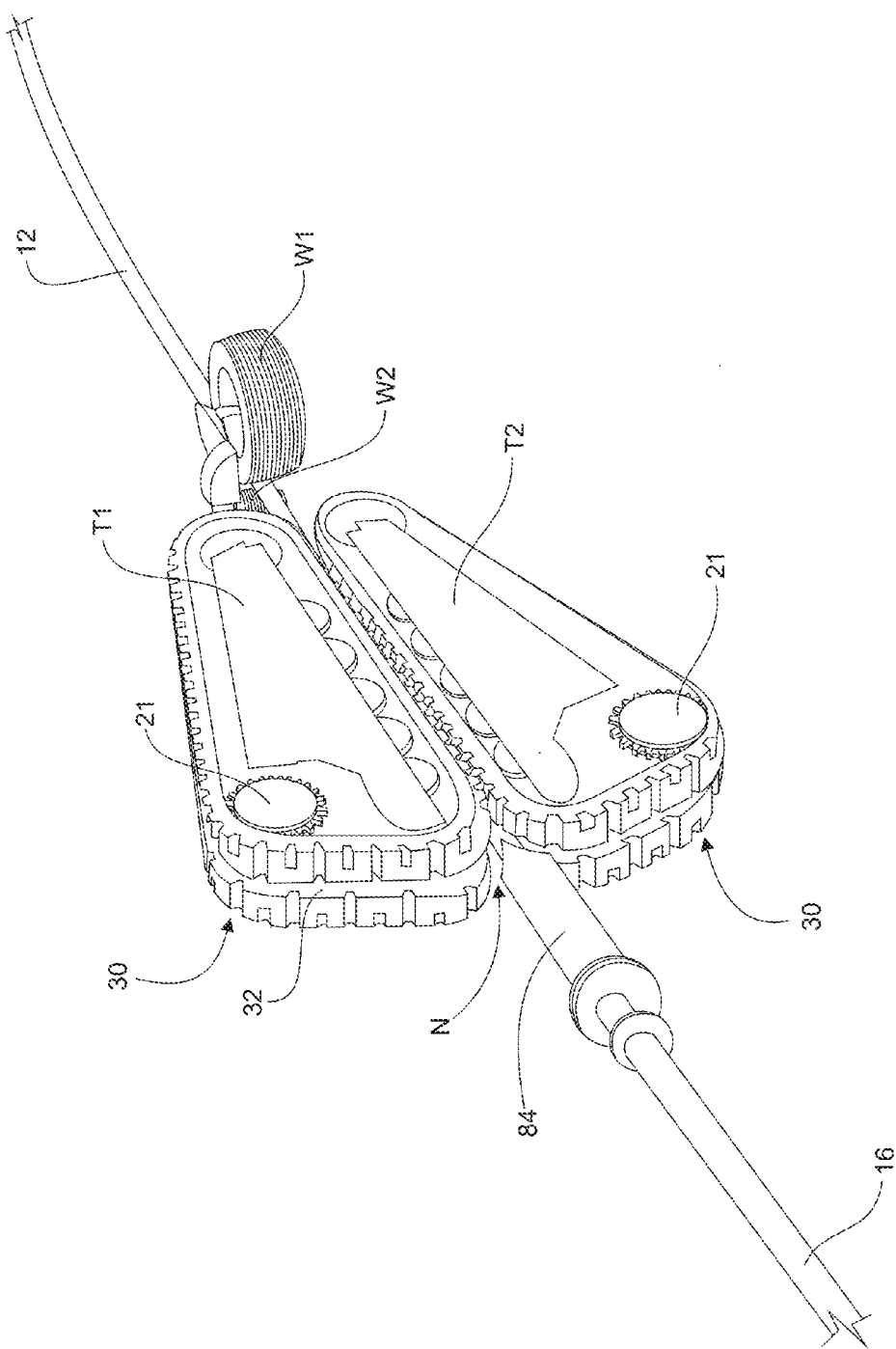
FIG. 7 is a front perspective view illustrating an open side of the pusher apparatus of FIG. 6 with the pusher and frame structure removed for illustrating the pilot tube, the pair of opposing tracks and guide wheels.

Best seen in FIGS. 5, 6 and 7, the drive 15 comprises at least a first pair of opposing, continuous and contra-rotating drive members such as track assemblies T1,T2. Each of the track assemblies T1,T2 comprises a track 20 which is driven about each assembly. The assemblies T1,T2 have a feed end for receiving the flexible liner, a nip N formed therebetween through which the flexible liner is frictionally driven, and a discharge end from whence the driven flexible liner exits the nip N through which the liner 12 is driven. So as to ensure sufficient frictional engagement with the liner 12, the tracks 20 of the track assemblies T1,T2 are resilient. A continuous track 20 is driven about each track assembly T1,T2 along a profile defined by least one drive sprocket spaced from at least one idler such as those provided a typical head and tail pulley of a belt conveyor. Other profiles (as shown) can include a triangular profile having one sprocket 21 spaced from two apex idlers 22,23 and rectangular profiles (not shown) having one sprocket spaced from three apex idlers. Other assemblies can implement one or more drive sprockets.

In the embodiment shown, each track assembly T1,T2 is a triangular, continuous track assembly comprising a drive sprocket 21 and two spaced apex idlers 22,23 about which a resilient or elastomeric track 20 is driven. A suitable track assembly T1,T2 is one typically associated with a tracked Bobcat™ skid-steer loader. Arranged between the apex idlers 22,23 is an array of intermediate idlers 24 for supporting and engaging the track 20 against a linear and distributed portion 25 of the liner 12. With reference to FIGS. 6 and 7, the drive sprocket 21 is driven by a motor 30, preferably through a gear reduction, for providing sufficient power to push liner 12, in some cases using composite liner 12, up to 2 kilometers. Preferably the motor 30 is a hydraulic motor. In testing, such a system is capable of driving a two inch composite liner 12 at least 2000 meters through old four inch pipe 14.

In one embodiment, the track 20 has a longitudinal groove 32 which aids in guiding the flexible liner 12 therein. A depth of such a longitudinal groove 32 is typically less than one half of the diameter of the flexible liner 12 so as to frictionally engage the liner 12. Alternatively, a width of such a groove 32 is less than a diameter of the liner 12, regardless of its depth so as to ensure contact for frictionally engaging therewith. As shown, a pair of opposing guide wheels W1,W2 can be employed to ensure that the liner enters the nip N of the track assemblies T1,T2. The guide wheels W1,W2 are typically un-driven and are oriented substantially perpendicular to the orientation of the track assemblies T1,T2.

Returning to FIGS. 1 and 2, the upper and lower track assemblies T1,T2 are supported by a pusher frame 42. The frame 42 can be supported on the trailer 18.

The upper track assembly T1 is preferably fixed high in the frame 42 and the lower track assembly T2 is moveable lower in the frame 42 for alternately advancing upwardly towards or downwardly for retracting from the first upper fixed track assembly T1 forming an adjustable nip N therebetween, alternately sandwiching or releasing the liner respectively.

The lower track assembly T2 is supported on a carriage 44 guided movable up and down on the pusher frame 42. The carriage 44 is movable by an actuator 46 to drive the lower track assembly T2, in this case upwardly, into engagement with the liner 12, sandwiching the liner 12 against the upper track assembly T1.

A suitable actuator or actuators 46 are air bags or pneumatic bellows for a controllable sandwiching or normal force on the liner 12.

As shown in FIG. 1, the pusher frame 42 is a generally rectangular structure having a base beam 50 movable on a pair of parallel rails 52. The frame 42 has a top beam 54 supporting the upper track assembly T1 and side posts 56 spacing the top beam 54 from the base beam 50. The lower track assembly T2 is mounted to the carriage 44 by a cross-beam 47. The carriage 44 comprises ends 48 of which are fit with roller guides 49 for guide movement up and down along the side posts 56 of the frame 42. The lower track assembly T2 carriage actuators 46 are spaced between the cross-beam 47 and the base beam 50. The actuators 46 can impose sufficient load on the lower track assembly T1 to sandwich and driveably grip the liner 12 therebetween.

In this embodiment, the upper track assembly T1 is fixed relative to the pusher frame 42. While the fixed versus movable track assembly orientation can be reversed, certain advantage is achieved having the upper tracked assembly T1 fixed and the lower tracked assembly T2 movable wherein, upon release of the carriage actuators 46, gravity assists in lowering the lower track assembly T2, opening the nip N.

Figure 10:
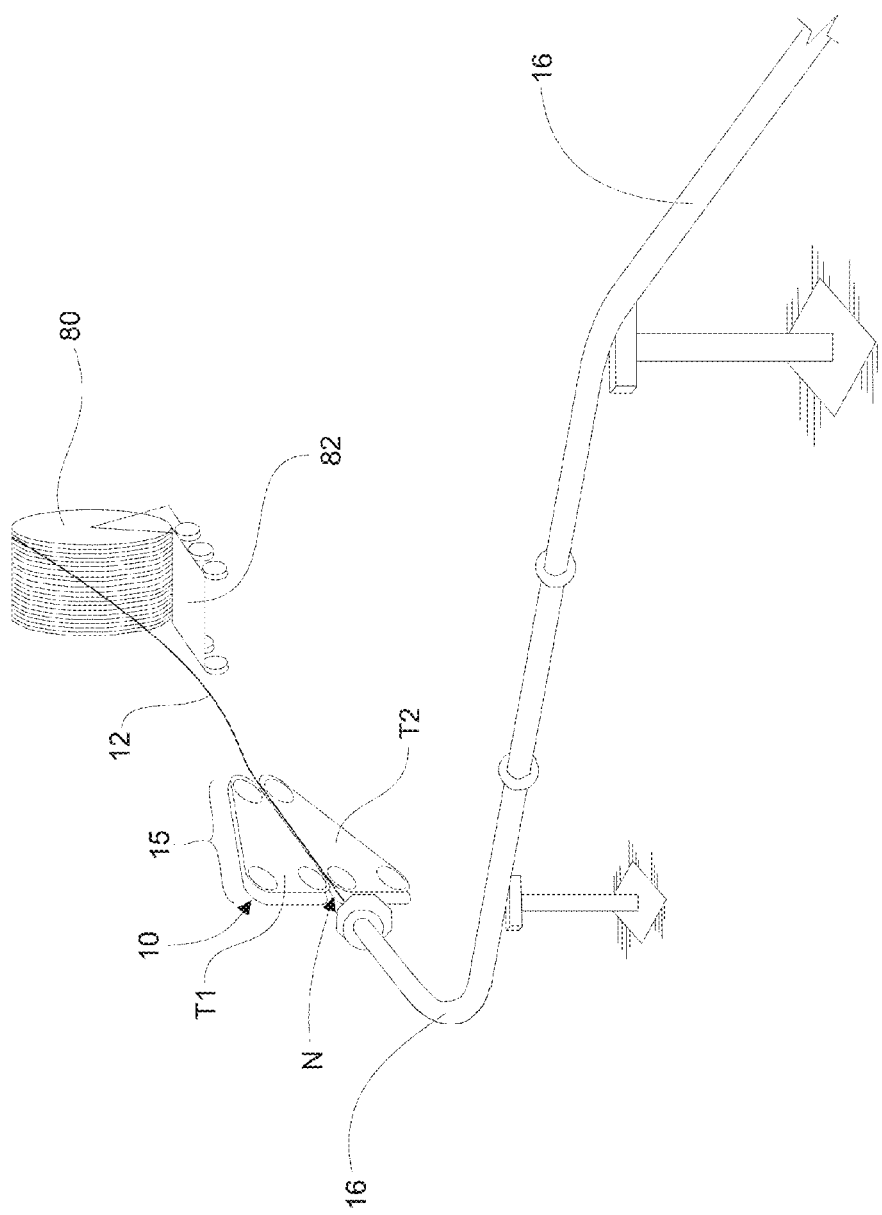
FIG. 10 is a front perspective view of a tracked pusher apparatus of FIG. 9, illustrating the reel, the pusher apparatus and liner extending therebetween for pushing through a guide tube.
Figure 11:
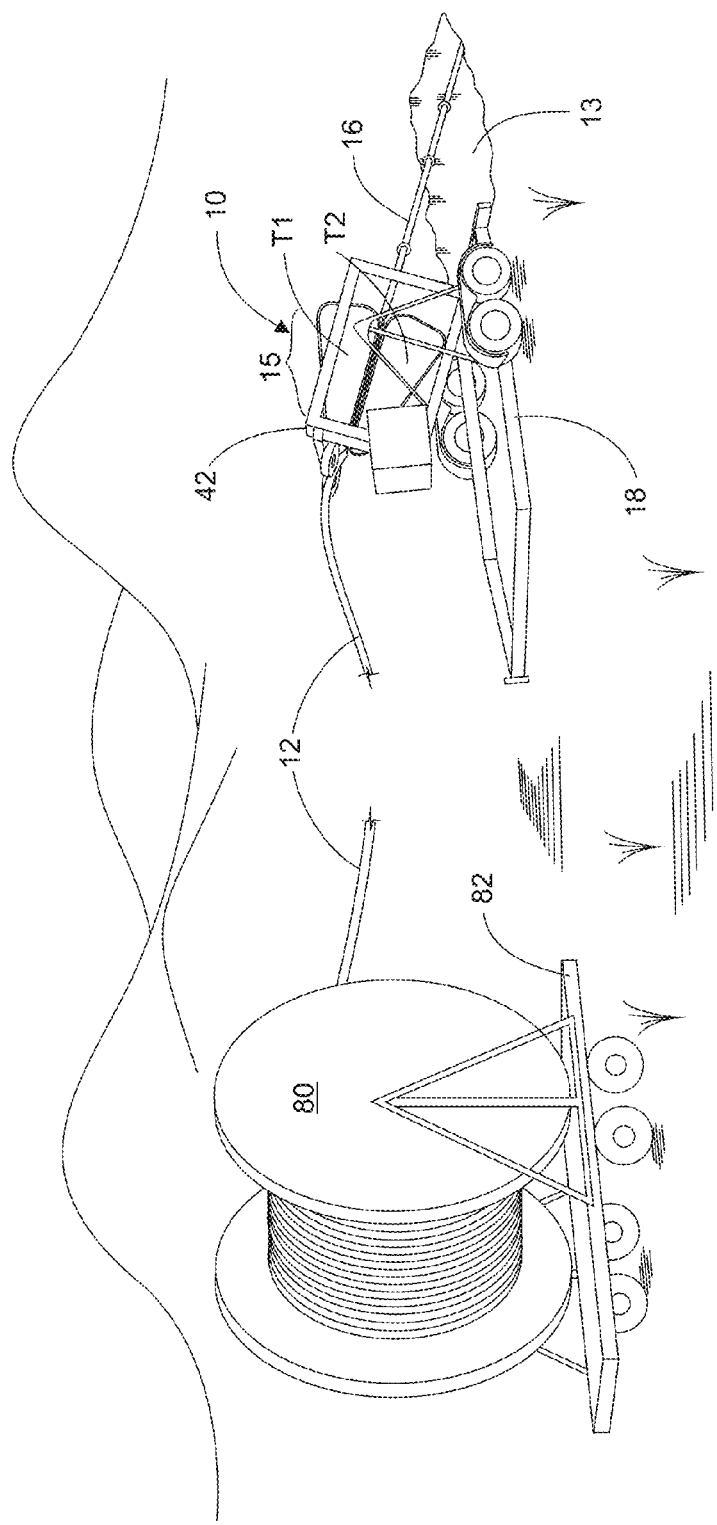
FIG. 11 is a back perspective view of a tracked pusher apparatus of FIG. 5, illustrating the reel, the pusher apparatus and liner extending therebetween for pushing through a guide tube extending into a pit.
Figure 12:
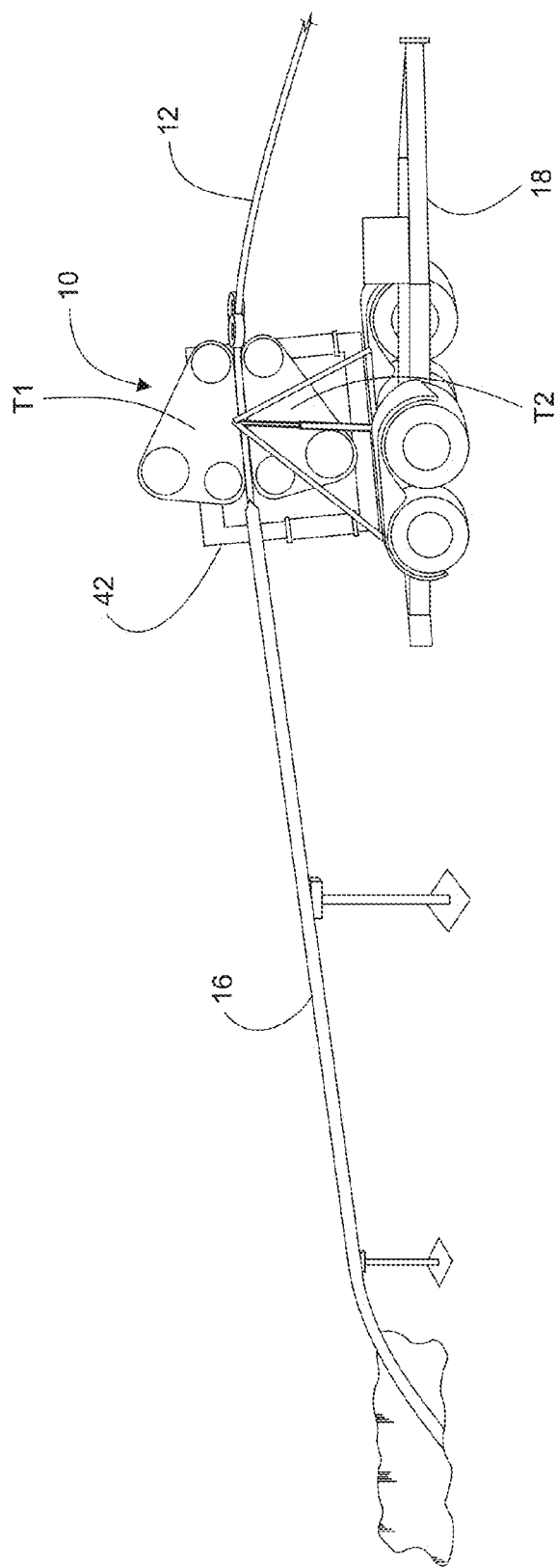
FIG. 12 is a side view of a pusher apparatus oriented for illustrating pushing a liner horizontally into a horizontal guide tube before curving into a pit.

The frame 42 is movable on the rails 52 for reactive movement away from the pipe 14 being lined. As the liner 12 is pushed through the guide tube 16 and into the pipe 14, reactive forces cause the structure or pusher frame 42, supporting the tracked assemblies T1,T2, to be urged away from the pipe 14. The rails 52 are pivotally supported from the base 17 for orienting the frame 42 and aligning the track assemblies with the guide tube 16. The guide tube 16 can be angled as shown in FIGS. 3 and 11, or substantially horizontal as shown in FIGS. 10 and 12. The base 17 is typically the trailer 18 which is fixed upon the ground.

A load cell 60 is secured between the frame 42 and the base 17 to restrain the reactive force on the frame 42. As the pushing force increases, the load cell 60 indicates a corresponding increase in reactive load. A counter 62 for lineal feet of liner 12 pushed can be installed at a discharge end 64 of the pusher apparatus 10.

Figure 8:
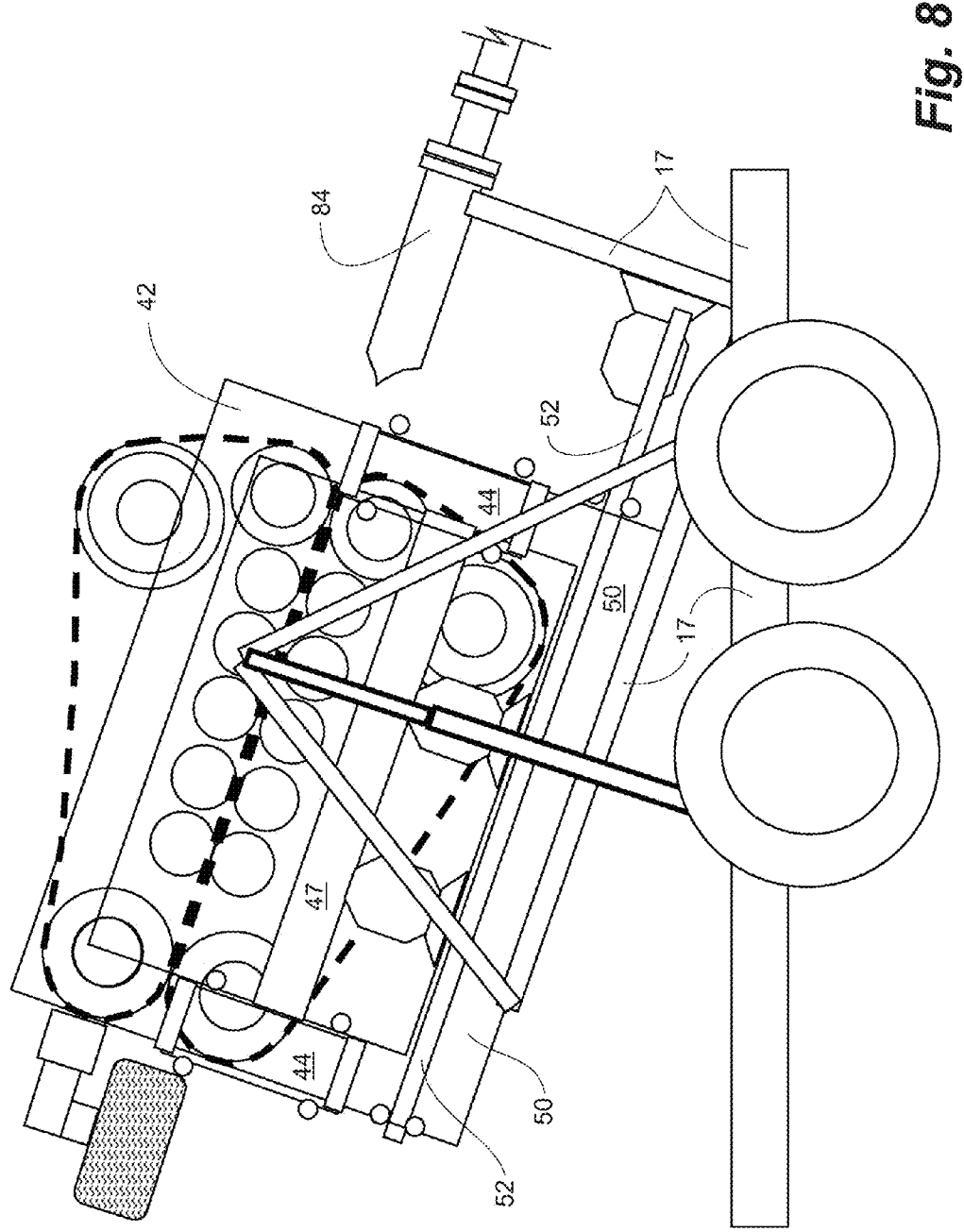
FIG. 8 is a schematic side view of the pusher apparatus of FIG. 1 before accepting a liner for operation, the pusher frame being pushed back on the rails for illustrating the inlet to the pilot tube.
Figure 9:
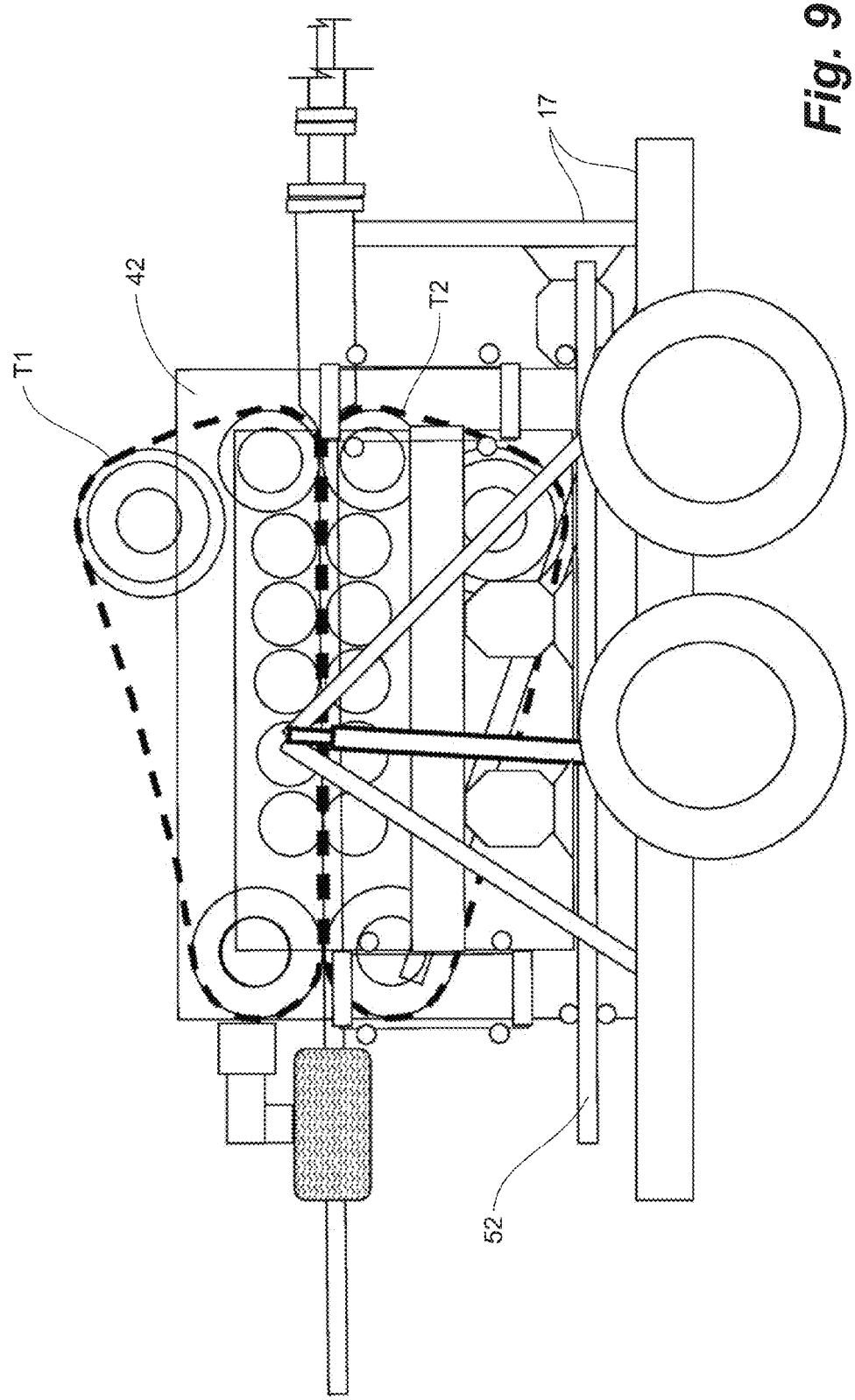
FIG. 9 is a schematic side view of pusher apparatus of FIG. 1 having the pusher frame in a substantially horizontal operational mode, the tracks being actuated to grip the liner for pushing liner horizontally.

In angled operations, the rails 52 are pivoted to an angle relative to the base 17. As shown in FIG. 8, for purposes of illustration, the frame 42 is shown backed-up or elevated on the rails 52 with an artificial separation between the frame 42 and a liner pilot tube 84 secured to the base 17.

Returning to FIGS. 1 and 5, frame 42 initially rolls down the rails 52 under gravity and against the load cell 60 (FIG. 1) and, before pushing liner 12, applies a compressive force thereon, this force being a negative "pushing" force. The load cell acts as force sensing bridge between the frame 42 and the base 17, conveniently through a load-sensing connection of the frame to the pilot tube 84. The apparent force on the load cell 60 can be zeroed by a frame actuator 66, such as a pneumatic actuator, positioned between the front end of the frame 42 and the base 17 for relieving the gravity load until the load cell 60 reads zero load. Thereafter, pushing of the liner 12 results in a reactive load which can be directly measured, if the frame 42 is horizontal (FIGS. 9, 10, 12), or calculated if the frame 42 is on an angle (FIGS. 1, 3, 11). While relative pushing force could be used for operations, an appropriate calculation can also be made as desired, accounting for the force vectors, so as to determine more representative pushing forces. Simply, whether the exact force is determined is not critical as relative increases in pushing forces can be measured. Over-force limits can be set and trigger shutdown of the track assemblies T1, T2 when the pushing force exceeds certain thresholds. An over-force limit can result such as when the liner 12 encounters an obstruction, an especially tortuous pipe path, or merely due to increasing frictional resistance. An over-limit can be set to avoid bucking or compressive failure of the liner 12.

Operations

Having reference to FIGS. 5, 10 and 11, the flexible liner 12 can be provided in a continuous length. Typically, the liner 12 is supplied from a reel 80. With reference to FIGS. 10 and 11, a tractor trailer 82 supporting the reel 80 is oriented to feed liner 12 to the drive 15, positioned adjacent an excavation with the guide tube 16 descending for delivery of guided liner 12 into the excavation.

As the tracks 20 of the first and second track assemblies T1,T2 are rotatably driven, the flexible liner 12 is advanced through nip N so as to direct the flexible liner 12 though the pilot tube 84 into a bore of the guide tube 16. The pilot tube 84 is spaced and closely coupled to a discharge of the nip N for supportably receiving the flexible liner 12. The pilot tube 84 has a inlet end 85 which is profiled like a pen nib to clear the tracks 20 entering the nip N, yet remains suitably closely coupled to support the flexible liner 12 against buckling.

An environmentally and liner-friendly lubricant, such canola oil, can be applied at about the pilot tube 84 or guide tube 16 for lubricating and aiding in reducing frictional resistance between the liner 12, the guide tube 16 and the pipe 14.

Figure 13:
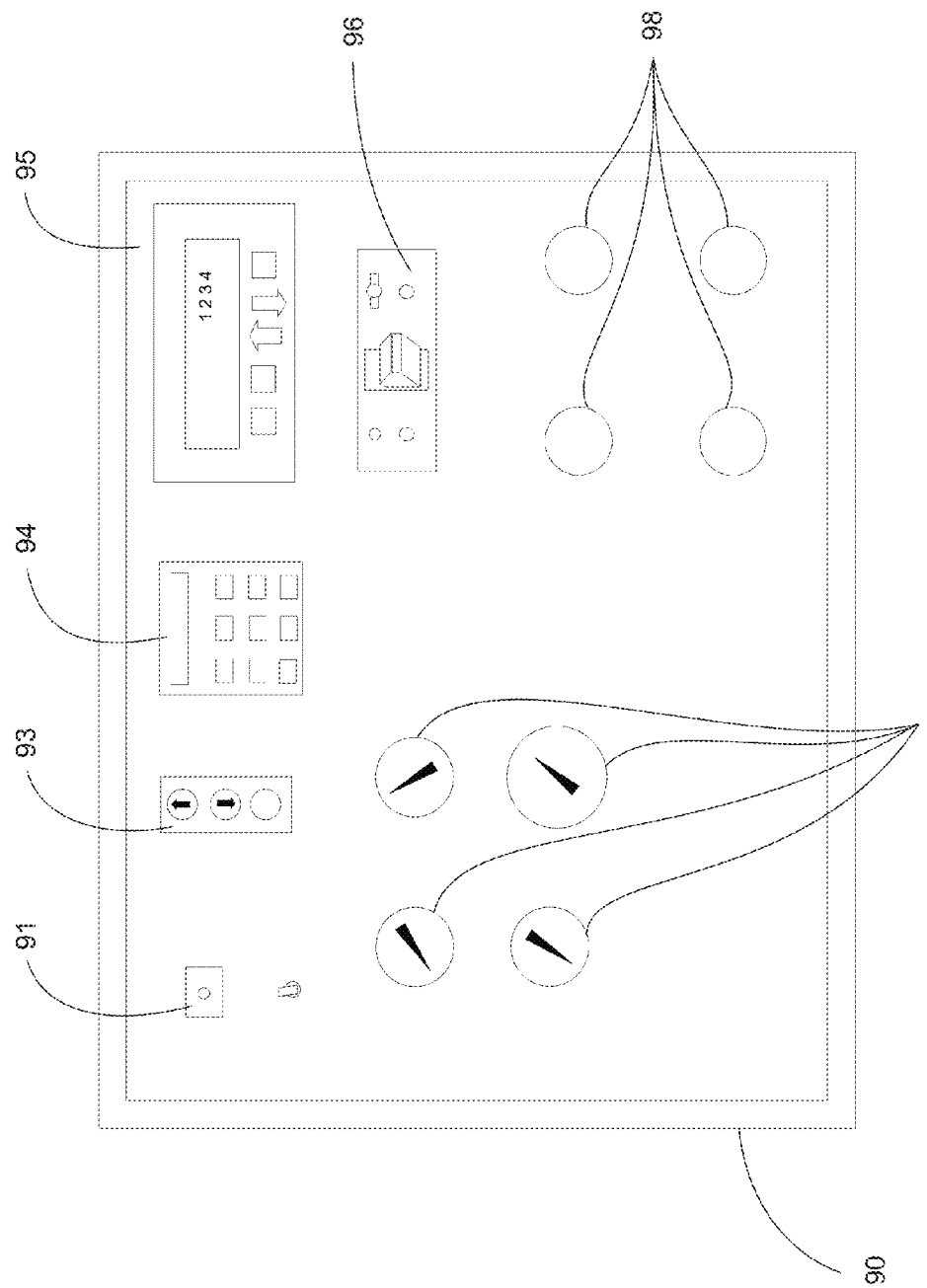
FIG. 13 is a view of a control panel for controlling the pusher apparatus illustrating clockwise from the upper left, the winch control, the pusher frame tilt control, the lineal counter, the load cell readout, the pusher speed and direction control, pneumatic actuator controls, and related pressure gauges.

Having reference to FIG. 13, a control panel 90 is provided for controlling and monitoring the operation of the tracked pusher apparatus 10. More particularly and in an embodiment of the invention, a winch control 91 is provided to permit operation and control of a winch (not shown) used during cleaning of the bore of the pipe 14. A tilt control 93 is provided to change the angle of the rails 52 and supported frame 42 relative to the base 17. A lineal counter display 94 is provided to display the number of lineal feet of liner 12 discharged to the pipe 14 as provided by the counter 62. Similarly a load cell readout display 95 is provided to display data from the load cell 60 and a speed and direction control 96 is provided. Movement of the lower track assembly T2 is adjusted with pneumatic controls 98 and related pressure gauges 99.

The apparatus can be controlled for control of lineal speed and pushing force.

Pulling Embodiment

In some instances the liner 12 for installation is not as strong as composite or fiberglass tubing. For example, non-reinforced plastic tubing is less capable and has insufficient strength to be pushed for any great distance.

Therefore, and with reference to FIGS. 14-18, and in another embodiment of the invention, the liner 12 is both pulled and pushed. A pull head 100, is configured to be substantially equivalent to a piston for a hydraulic fit to the pipe 14 being lined. The pull head 100 is driven using fluid such as compressed air, to pull a leading end 101 of the flexible liner 12 along the pipe 14.

This embodiment is also suitable for further enhancing the wheeled pushing apparatus as described in Applicant's copending application CA 2,452,413, published Mar. 5, 2005, the entirety of which is incorporated herein by reference for all purposes. Therefore, for even greater capability overall for more capable liner 12, the tracked pusher embodiment can be used in combination with the pulling embodiment.

Figure 15:
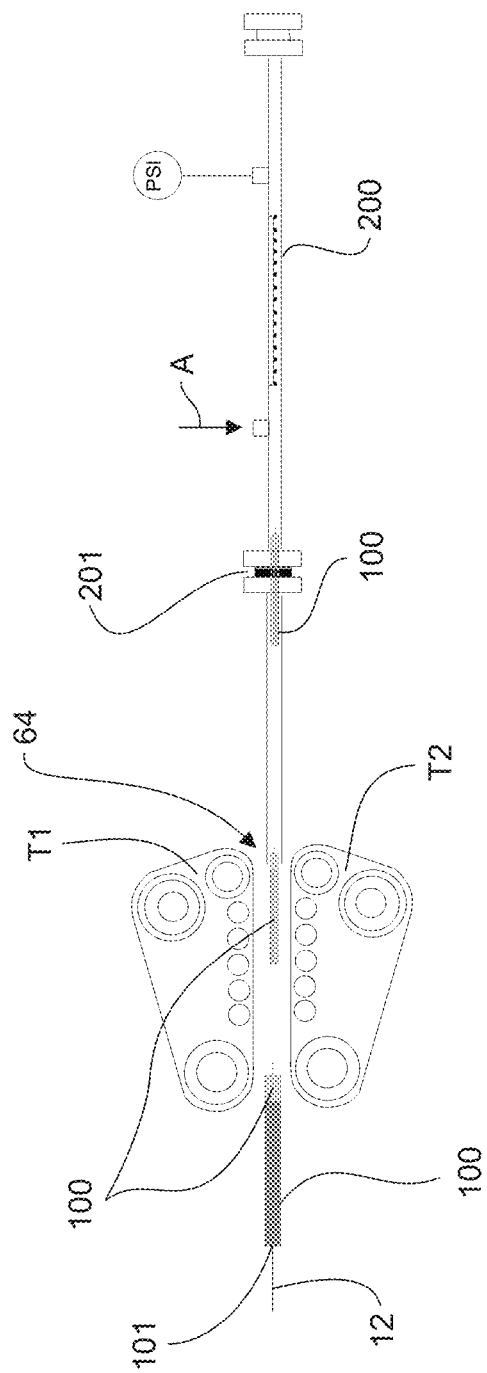
FIG. 15 is a schematic side view of the track pusher embodiment illustrating all three steps of the pull head into, through and out of the track pusher and into a pig launcher.

As shown in FIG. 15, in the context of the tracked pusher embodiment, the tracked assemblies T1, T2 continue to push the liner 12. The pull head 100 introduces tension onto the leading end 101 of the liner 12 and the tracked assemblies T1, T2 introduce compression into the driven portion of the liner 12. Somewhere along the liner 12 will be a neutral portion having substantially no tension or compression therein. The maximum load in the liner 12 at any point being reduced substantially and by as much as 50% from the pushing embodiments alone.

To enable both pulling and pushing, pull apparatus is incorporated to enable installation of the pull head 100 and application of compressed fluid. A form of existing pig launcher 200 and pig 202 can be used. A pipe wiper or seal 201 is positioned at the discharge end 64 of the tracked assemblies T1,T2 so that fluid pressure is retained and acts upon the pig 202 attached to pull head 100. Such pipe wipers 201 are known in the oil and gas well industry through which coil tubing or tubulars are inserted into a well. The lubricant can aid in extending the life of the pipe wiper 201. Pressurized fluid, such as air A, is introduced into the guide tube 16 downstream of the pipe wiper 201.

Figure 14:
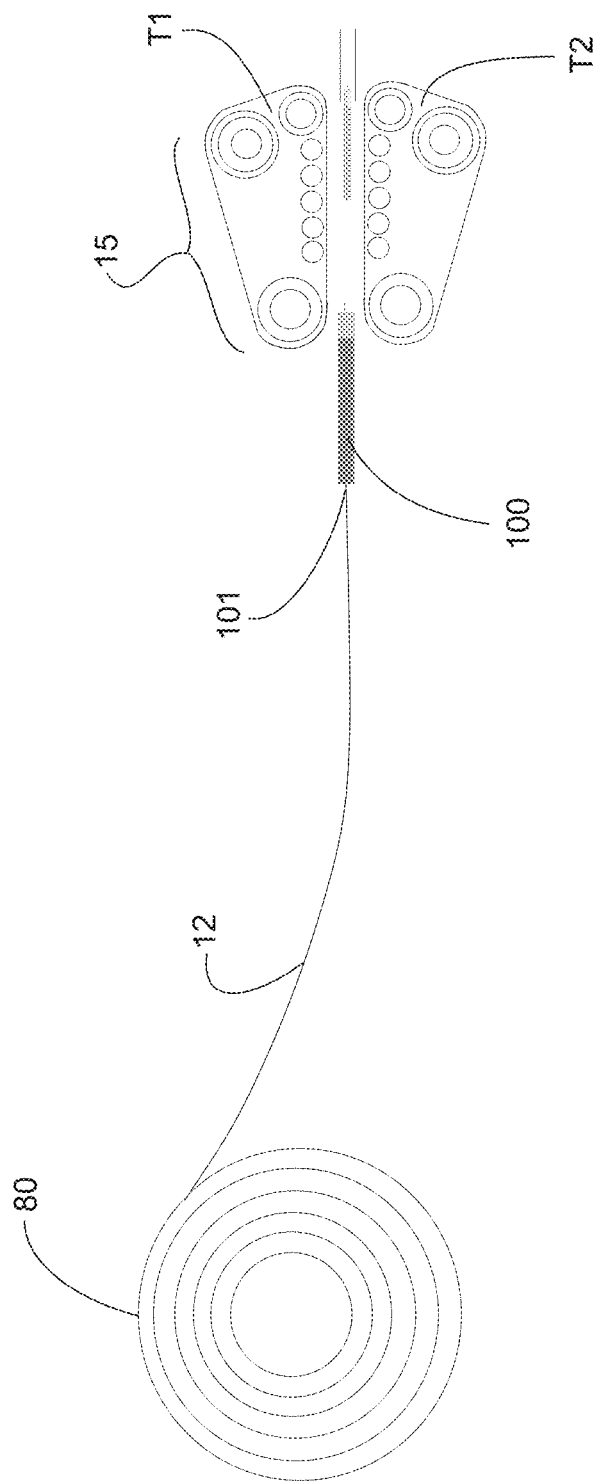
FIG. 14 is a schematic side view of the reel with a liner leading end fit with a pull head for insertion into a tracked pusher embodiment.

With reference to FIGS. 14 and 15 the pull head 100 can be driven into, through and out of the tracked assemblies T1, T2.

Figure 16A:
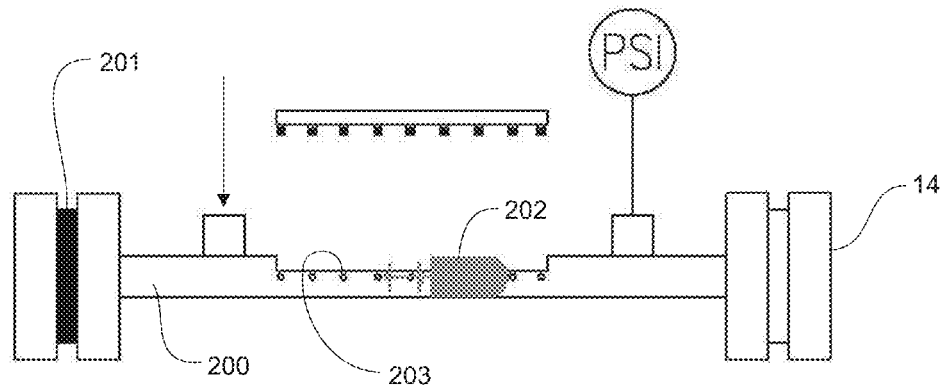
FIGS. 16A, 16B and 16C are schematic side views according to FIG. 15, illustrating three steps respectively, first installing a pig through the pig launcher, secondly connecting the pig to the pull head, and lastly closing the launcher in preparation for actuating pig-pulling of the liner.
Figure 16B:
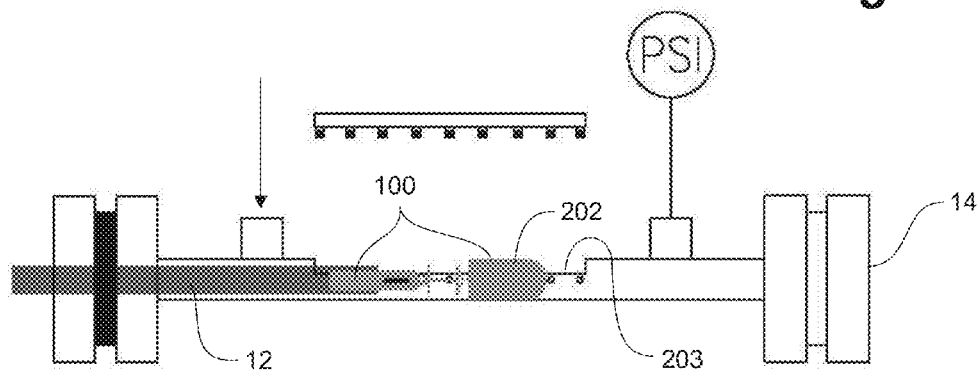
Figure 16C:
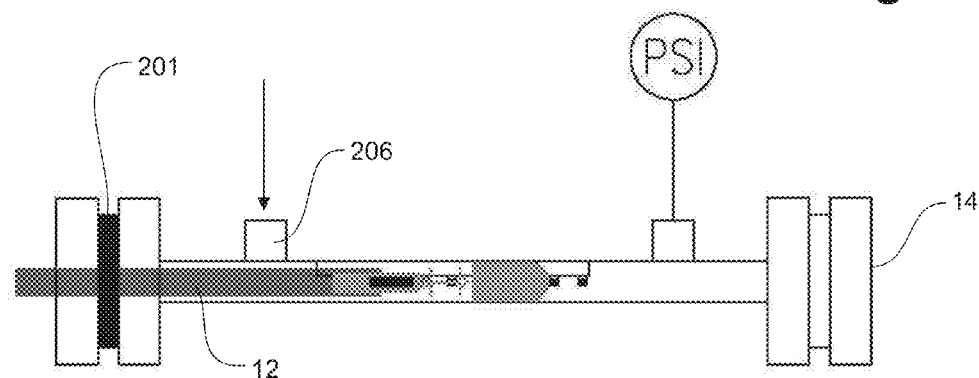

FIGS. 16A, 16B and 16C illustrate first installing a pig 202 through an access port 203 in the pig launcher 200, secondly connecting the pig 202 to the pull head 100, and lastly closing port 203 in the pig launcher 200 in preparation for actuating pig-pulling of the liner 12. More particularly, as shown in FIG. 16A, the pig launcher 200 is first opened. Thereafter, as shown in FIG. 16B, the pull head 100 is pushed into the pig launcher 200 wherein the pig 202 and the pull head 100 are operatively engaged therebetween. As shown in FIG. 16C, once the pig 202 and the pull head 100 are engaged, the pig launcher 200 is closed in preparation for launching the pig 202 and pull head 100 for pulling the liner 12 attached thereto.

Figure 17A:
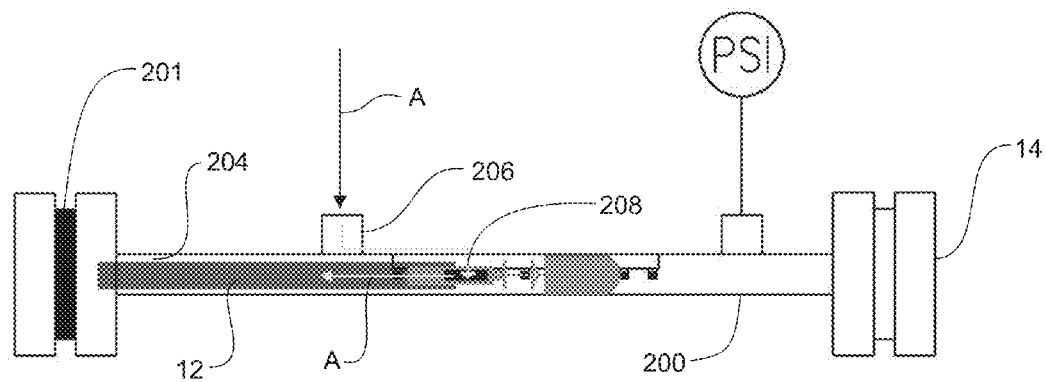
FIGS. 17A and 17B are schematic side views of the pig and pull head during the introduction of air for first pressuring up the liner to the reel and then pressuring of the annular space between the liner and the pipe.
Figure 17B:
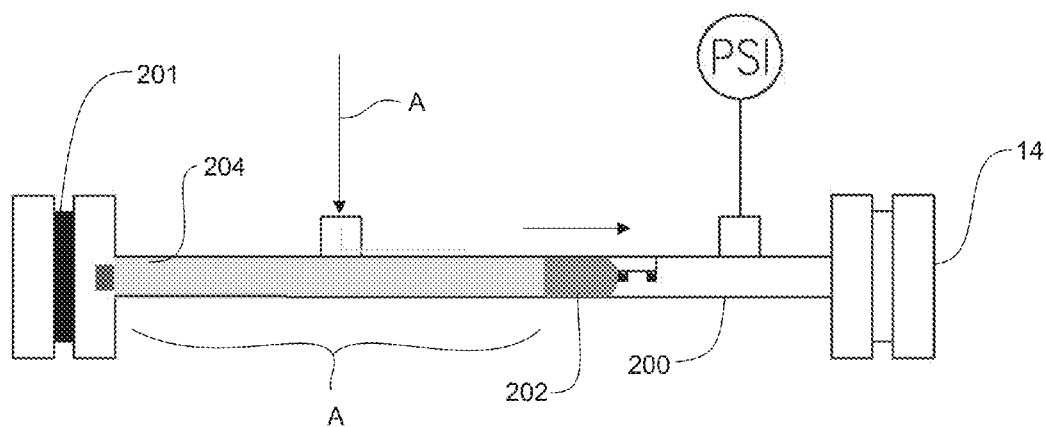

FIGS. 17A and 17B illustrate introduction of air A for pressuring up the liner 12 to the reel 80, stiffening or strengthening the liner 12 and followed by pressurizing of an annular space 204 within the pig launcher 200, between the pig launcher and the pig 202 and connected pull head 100. More particularly, as shown in FIG. 17A, air A is introduced into the pig launcher 200 through a fluid port 206 and enters the pull head 100 through a slot 208 formed therein. The air A flows through the slot 208 and into the liner 12, flowing down the liner 12 to the reel 80 so as to increase the rigidity of the liner 12 which aids in pushing. As shown in FIG. 17B, once the liner 12 has been substantially filled with air A, the air A pressurizes the annular space 204 in the pig launcher 200. The air in the annular space 204 acts to launch the pig 202 and the attached pull head 100 and liner 12 into the pipe 14 when the pig launcher 200 is opened to the pipe 14.

Figure 18:
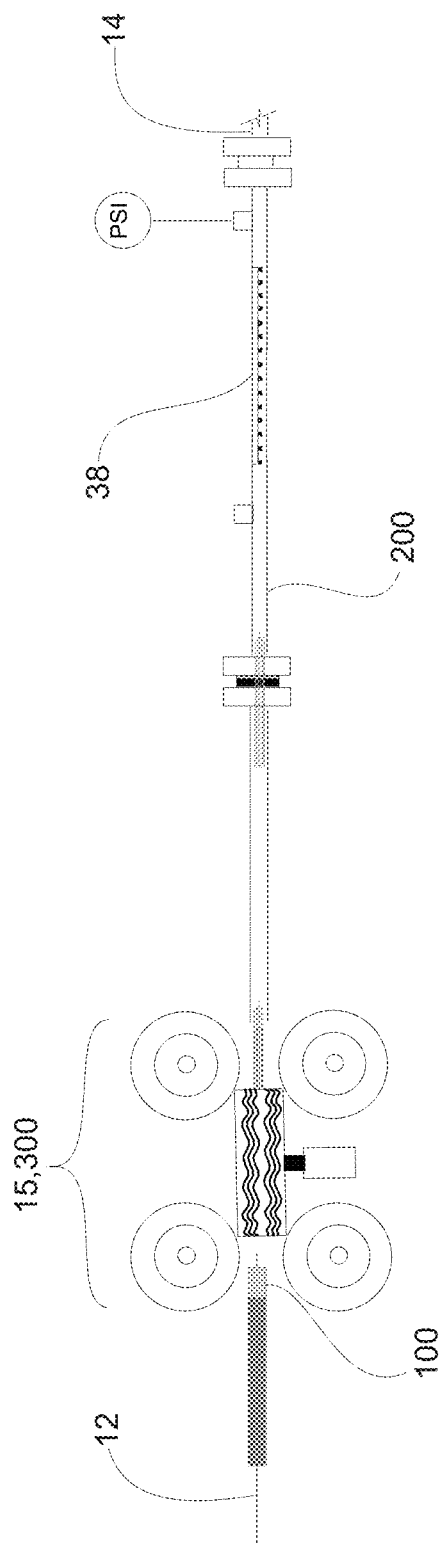
FIG. 18 is a schematic side view of a wheeled pusher embodiment illustrating all three steps of the pull head into, through and out of the wheeled pusher and into a pig launcher.

As shown in FIG. 18, drive 15, such as a wheeled pusher 300, can be substituted for the tracked pusher T1,T2 embodiment, where liner 12 is used which is compatible with the higher loads associated with wheeled pushers.

In other optional embodiments, the tracked form of pusher apparatus 10 can be adapted for direct attachment to an exposed end of the pipe 14 or, as set forth in Applicant's co-pending application CA 2,452,413, an intermediate guide tube 16 can be adapted for direct attachment to an exposed end of the in-situ pipe 14. The guide tube 16 acts to guide the flexible liner 12 along a path into the bore of the pipe 14. The guide tube 16 may be continuous or sectional and has a first connection to the pipe 14 and a second connection to the drive 15.

The guide tube 16 can be formed of sections of metal piping. A plurality of straight sections and curved sections can be combined to adjust for elevation and angle. Sections of guide tube 16 can be connected with means such as flanges.

The supply or source of the liner 12 is typically misaligned or at an angle to the existing pipe 14. This is the case when the liner 12 is supplied from an elevation above the pipe 14. Accordingly, the guide tube 16 can be arcuate or curved so as to provide at linear portion 38 at a discharge end having a bore substantially aligned with the bore of the in-situ pipe 14 and aligned with the liner 12 coming from the drive 15.

Optionally, if the in-situ pipe has not already been prepared for a liner 12, the apparatus 10 could optionally be used to prepare or ream the pipe 14. As set forth in Applicant's co-pending application CA 2,452,413, published Mar. 5, 2005, the apparatus 10 further permits the advance and subsequent retraction of other means for reaming the bore of the pipe 14, such as metal or fiberglass rods of various diameter and surfaces, which can be used prior to insertion of the flexible liner 12, should the bore of the in-situ pipe 14 be badly blocked. The reader is referred to Canadian application 2,452,413 for additional materials. Accordingly, one can implement a leading device such as a bullet adapted for connection to a leading end of the liner 12. The substantially inflexible bullet is provided so as to prepare or ream an inner surface of the in-situ pipe 14 in advance of the liner 12 as it is pushed thereinto and thereby permits substantially unobstructed advance of the flexible liner 12 therein. A suitable bullet would be a 2½ inch diameter steel member for preparing the pipe 14 ahead of a 2 inch diameter flexible liner 12. As an arcuate guide tube 16 is normally intolerant of the passage of an inflexible bullet, the guide tube 16 is fit with an access port formed in a linear portion which is aligned with the pipe 14. The access port is sufficiently long to accommodate bullet through an upper surface of the guide tube 16. The substantially inflexible bullet is inserted into the access port and connected to the leading end 101 of the flexible liner 12. Thus, the access port solves the problem of attempting to pass an inflexible element through a curved guide tube 16. Fluids displaced from the pipe 14 can also escape through the access port. Further, positioning and connection of the bullet at the aligned portion of the guide tube 16 permits the diameter of the bullet to be only slightly smaller than that of the bore of the in-situ pipe 14, improving the bullet's reaming capability therein.

The reaming operation can be conducted in two operations; initially a first time to advance a reaming member such as flexible fiberglass rods into the pipe 14. Once the rod is extracted, the flexible liner 12 can then be pushed through the conditioned pipe 14.

For example, rods can be provided for use with badly scaled pipe 14, wherein the pipe's bore has a greater degree of occlusion, and to be passed through the in-situ pipe 14 prior to advancing the flexible liner 12 and bullet into the pipe 14. The rods are relatively flexible and capable of passing through the curved portion of the guide tube 16. The rods are provided in sections, each section threaded for connection to a subsequent section. Further, each section has an upset formed at one end, the upset being sized larger than the diameter of the flexible liner 12 and capable of acting against the inner surface of the in-situ pipe 14 to remove scale. Sections of rods are connected and driven into the in-situ pipe using the same apparatus as is used for the flexible liner 12.

Once the rods have been advanced to prepare the entire length of the in-situ pipe 14, it is retrieved from the pipe 14 using the winch.

The invention claimed is:

1. Apparatus for driving a flexible tubular comprising:
   at least a first pair of resilient and contra-rotating tracks having a nip formed therebetween through which the flexible tubular is frictionally driven, each track being continuous and forming a parallel and linear engagement portion for engaging the flexible tubular;
   a drive motor for driving at least a first driven track of the first pair of contra-rotating tracks;
   wherein the flexible tubular is a flexible liner for insertion into the bore of an existing in-situ pipe, further comprising a guide tube adapted to the in-situ pipe and extending between the contra-rotating tracks and the bore of the in-situ pipe for guiding the liner into the bore of the in-situ pipe;
   a pull-head, which is sealable to the in-situ pipe, and secured to a leading end of the flexible liner; and
   a liner seal for sealing about the flexible liner in the guide tube wherein, when a fluid is introduced intermediate the pull head and the liner seal, the pull head is urged along the in-situ pipe for pulling the flexible liner therewith while the contra-rotating tracks push the flexible liner.

2. The apparatus of claim 1 wherein the at least a first pair of contra-rotating tracks further comprise a first track assembly and a second track assembly.

3. The apparatus of claim 1 further comprising a guide tube spaced from a discharge of the nip for guiding the flexible tubular therefrom.

4. The apparatus of claim 1 further comprising a pilot tube spaced and closely coupled from the discharge of the nip for receiving the flexible tubular and guiding the flexible tubular into the guide tube.

5. The apparatus of claim 1 further comprising a pusher frame for supporting the contra-rotating track assemblies, an upper track assembly of the first pair being fixedly supported from the pusher frame and an opposing lower track assembly of the first pair being movably supported for adjusting the nip therebetween.

6. The apparatus of claim 5 further comprising a base upon which the pusher frame is movably guided for enabling reactive movement away from the flexible tubular being pushed for determining measures of a pushing load between the pusher frame and the base.

7. The apparatus of claim 1 further comprising a pull-head launcher positioned along the guide tube and between the liner seal and in-situ pipe for insertion of the pull-head.

8. Apparatus for inserting a flexible liner into the bore of an existing in-situ pipe, the apparatus comprising:
   a drive for pushing a flexible liner in the bore of the in-situ pipe, the drive having at least a first pair of contra-rotating resilient liner-engaging drive members having a nip formed therebetween through which the flexible liner is frictionally driven;
   a drive motor connected to drive at least one of the first pair of contra-rotating drive members;
   a guide tube extending between the drive and the bore of the in-situ pipe, and sealed thereto, for guiding the liner into the bore of the in-situ pipe;
   a pull head, which is sealable to the in-situ pipe, and secured to a leading end of the flexible liner;
   a liner seal for sealing about the flexible liner in the guide tube; and
   a fluid port for introduction of fluid intermediate the pull head and the liner seal for hydraulically urging the pull head along the in-situ pipe and pulling the flexible liner therewith while the drive members push the flexible liner.

9. The apparatus of claim 8 further comprising a pull-head launcher along the guide tube and between the liner seal and in-situ pipe.

10. The apparatus of claim 8 wherein the first pair of contra-rotating resilient liner-engaging drive members are a first pair of opposing and contra-rotating resilient tracks.

11. The apparatus of claim 8 further comprising a pusher frame for supporting the driving members, one drive member of the first pair being fixedly supported from the pusher frame and an opposing drive member of the first pair being movably supported for adjusting the nip therebetween.

12. The apparatus of claim 11 further comprising rails upon which the pusher frame is movably guided for enabling reactive movement away from the flexible liner being pushed for determining measures of a pushing load therebetween.

13. The apparatus of claim 11 wherein the pusher frame can be angled for better aligning the flexible liner with the in-situ pipe.

* * * * *